US010384792B2

(12) United States Patent
Snyder

(10) Patent No.: US 10,384,792 B2
(45) Date of Patent: *Aug. 20, 2019

(54) AIRCRAFT VEHICLE THERMAL MANAGEMENT SYSTEM AND METHOD

(71) Applicant: Rolls-Royce Corporation, Indianapolis, IN (US)

(72) Inventor: Douglas J. Snyder, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,743

(22) Filed: Jul. 16, 2018

(65) Prior Publication Data

US 2018/0327103 A1 Nov. 15, 2018

Related U.S. Application Data

(63) Continuation of application No. 14/692,104, filed on Apr. 21, 2015, now Pat. No. 10,053,222, which is a
(Continued)

(51) Int. Cl.
*B64D 41/00* (2006.01)
*B64D 33/08* (2006.01)
(Continued)

(52) U.S. Cl.
CPC .............. *B64D 33/08* (2013.01); *B64D 13/06* (2013.01); *B64D 27/10* (2013.01); *B64D 41/00* (2013.01); *B64D 2221/00* (2013.01); *Y02T 50/44* (2013.01)

(58) Field of Classification Search
CPC .... B64D 2013/0614; B64D 2013/0659; B64D 2221/00
See application file for complete search history.

(56) References Cited

U.S. PATENT DOCUMENTS 4,505,124 A 3/1985 Mayer
5,105,875 A 4/1992 McArthur
(Continued)

FOREIGN PATENT DOCUMENTS

EP 1902950 A1 3/2008
EP 2354864 A1 8/2011

OTHER PUBLICATIONS

International Search Report for PCT/US2013/066312 dated Jan. 31, 2014.

*Primary Examiner* — Richard G Davis
(74) *Attorney, Agent, or Firm* — Fishman Stewart PLLC

(57) ABSTRACT

An air vehicle power and thermal management system includes an aircraft controller structured to distribute power provided by a gas turbine engine between a cooling system and an electrically powered load. The controller is configured to direct the power to create a first duration cooling power to the cooling system to cool the engine fuel cooling medium over a first power time period. The controller is configured to shift the power to reduce the first duration cooling power to create a load electrical power to drive the electrically powered load over a second power time period. By operation of the controller to shift the power from the first duration cooling power to the load electrical power a second duration cooling power is provided to the cooling system to cool the electrically powered load using the engine fuel cooling medium that was cooled during the first power time period.

20 Claims, 6 Drawing Sheets

Related U.S. Application Data continuation of application No. PCT/US2013/066312, filed on Oct. 23, 2013.

(60) Provisional application No. 61/720,944, filed on Oct. 31, 2012.

(51) Int. Cl.
*B64D 13/06* (2006.01)
*B64D 27/10* (2006.01)

(56) References Cited

U.S. PATENT DOCUMENTS

| | | |
|---|---|---|
| 5,899,085 A | 5/1999 | Williams |
| 6,205,803 B1 | 3/2001 | Scaringe |
| 7,859,845 B2 | 12/2010 | Ullman et al. |
| 2009/0002948 A1* | 1/2009 | Jarlestal ............ B64D 13/00 361/701 |
| 2009/0126900 A1* | 5/2009 | Scherer ............ B64D 11/04 165/41 |
| 2009/0152942 A1 | 6/2009 | Waite et al. |
| 2010/0212857 A1 | 8/2010 | Bulin et al. |
| 2010/0313591 A1* | 12/2010 | Lents ............ F02C 7/10 62/259.2 |

* cited by examiner

AIRCRAFT VEHICLE THERMAL MANAGEMENT SYSTEM AND METHOD

CROSS-REFERENCE TO RELATED APPLICATIONS

This application is a continuation application of U.S. patent application Ser. No. 14/692,104, filed Apr. 21, 2015, which is a continuation of International Patent Application PCT/US13/66312, filed Oct. 23, 2013, which claims priority to Provisional Patent application 61/720,944, filed Oct. 31, 2012. The contents of all of the applications are hereby incorporated by reference in their entirety.

TECHNICAL FIELD

The present application relates to an aircraft vehicle thermal management system and method, and more particularly, to a system and method responsive to an electrical load.

BACKGROUND

Aircraft vehicle thermal management systems and methods remain an area of interest. Some existing systems have various shortcomings, drawbacks, and disadvantages relative to certain applications. Accordingly, there remains a need for further contributions in this area of technology.

SUMMARY

One embodiment of the present application is an aircraft vehicle thermal management system that provides power to a cooling system to cool a cooling fluid in a reservoir and then reduces the power to the cooling system and provides power to an electrical system to drive the electrical system and uses the cooled cooling fluid to cool the electrical system. Other embodiments include unique methods, systems, devices, and apparatus to provide for an aircraft vehicle thermal management system. Further embodiments, forms, objects, aspects, benefits, features, and advantages of the present application shall become apparent from the description and figures provided herewith.

BRIEF DESCRIPTION OF THE FIGURES

Features of the application will be better understood from the following detailed description when considered in reference to the accompanying drawings, in which.

DETAILED DESCRIPTION OF REPRESENTATIVE EMBODIMENTS

Figure 1:
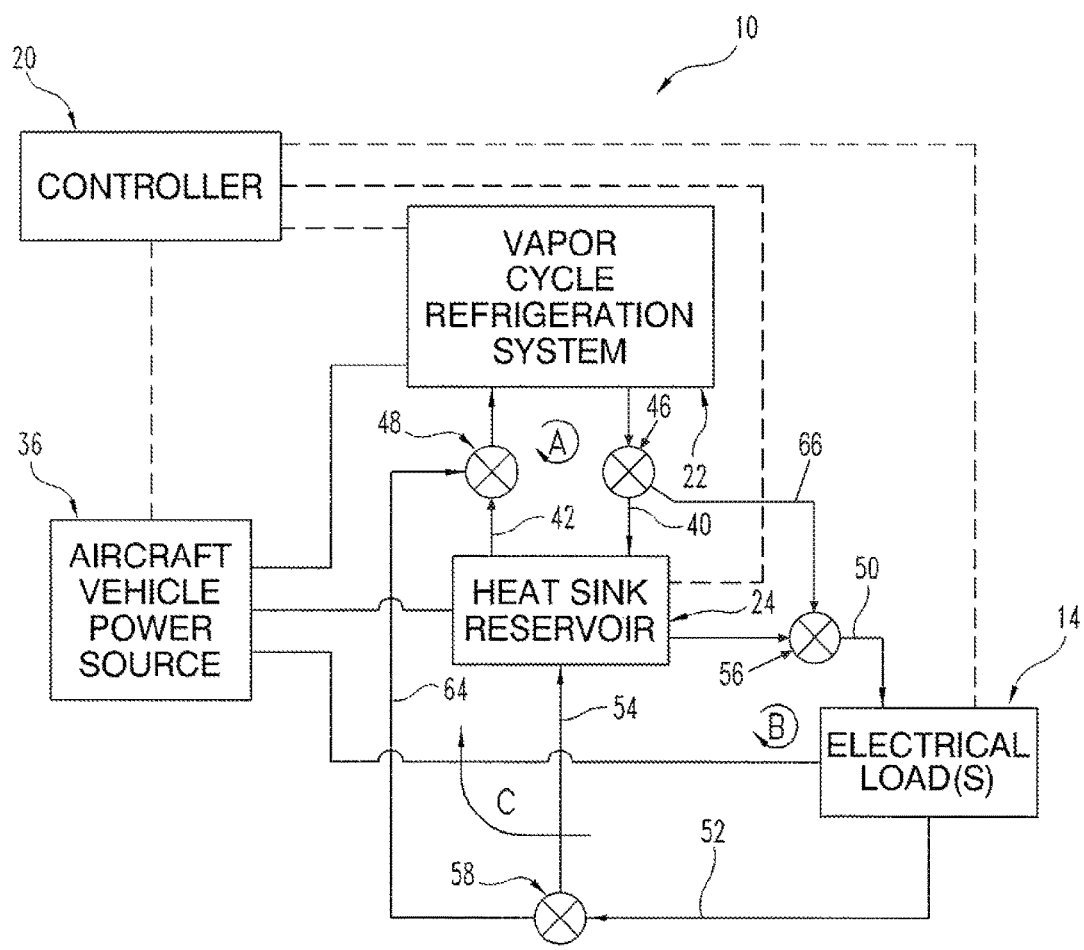
FIG. 1 is a block diagram of an aircraft vehicle thermal management system according to an embodiment.

While the present disclosure can take many different forms, for the purpose of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications of the described embodiments, and any further applications of the principles of the disclosure as described herein, are contemplated as would normally occur to one skilled in the art to which the disclosure relates.

FIG. 1 illustrates an aircraft vehicle thermal management system 10 according to an embodiment. The thermal management system 10 can be used to manage the thermal requirements of one or more electrical or other engine or vehicle thermal loads 14 of the aircraft. It will be appreciated that the terms used herein, for example, "electrical or other engine or vehicle thermal loads 14" or "electrical load 14" or similar terms, are intended to include any load that has a thermal demand or thermal requirement, whether an electrical load, an engine load, a thermal load, and/or combinations thereof, and for purposes of clarity and brevity the description herein will refer to such loads or combinations of loads by the term "electrical load 14." An electrical load 14 can include, for example, the environmental control system (ECS), directed energy weapon(s), avionics, high load low duty cycle applications, hot electronics, actuators, flight controls, heaters and refrigeration units, and/or de-ice and anti-ice devices.

The thermal management system 10 can include a controller 20, a refrigeration system 22, and a heat sink reservoir 24 used to contain a heat sink such as a heat sink fluid (hereafter "heat sink"). As indicated by the solid lines in FIG. 1, an aircraft vehicle power source 36 can provide power to the components of the thermal management system 10 and the electrical load 14. Further, as indicated by the dashed lines in FIG. 1, the controller 20 can be configured to distribute power among/between the aircraft vehicle power source 36 and the thermal management system 10 and the electrical load 14.

The refrigeration system 22 and the heat sink reservoir 24 can singly or in combination regulate heat sink flow to regulate the temperature of the electrical load 14, as will be described in greater detail below. The lines having arrowheads in FIG. 1 indicate example fluid flow passages of the heat sink. The heat sink can be stored in the heat sink reservoir 24. In the illustrated embodiment, the heat sink can be transferred from the heat sink reservoir 24 to the refrigeration system 22 to cool the heat sink, or from the heat sink reservoir 24 to the electrical load 14 to cool the electrical load 14. The heat sink can be any heat sink suitable for refrigeration. In one form, the heat sink comprises a fuel heat sink, such as gas turbine engine fuel. In another form, the heat sink comprises water, water with anti-freeze, a polyalphaolefin (PAO), or other fluid.

In the non-limiting embodiment of FIG. 1, the refrigeration system 22 is depicted as a vapor cycle refrigeration system and can cool the heat sink via a heat sink loop A formed by the refrigeration system 22, a first fluid flow passage 40, the heat sink reservoir 24, and a second fluid flow passage 42. It will be appreciated that refrigeration systems other than vapor cycle can be used. For ease of reference below, however, the refrigeration system 22 may be referred to as a vapor cycle refrigeration system but no limitation is intended regarding the type of refrigeration system used in any given embodiment. In one form, the vapor cycle refrigeration system 22 can include one or more compressors, condensers, expansion valves, and/or evaporators. Further, the vapor cycle refrigeration system 22 can take the form of any number of vapor cycle refrigeration stages; the FIG. 1 embodiment comprises a single stage refrigeration system.

Though the illustrated embodiment depicts the heat sink being routed to the refrigeration system 22 from the heat sink reservoir 24, not all embodiments need be constructed as such. Accordingly, in some forms the refrigeration system 22 need not receive a dedicated passage of heat sink from the heat sink reservoir 24, but instead can provide a refrigerant within a refrigerant passage to the heat sink reservoir 24.

Figure 2A:
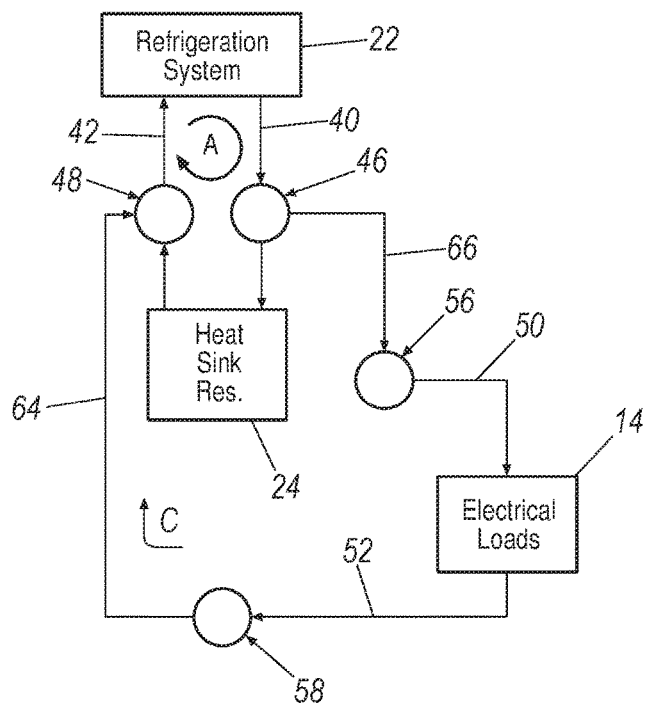
FIGS. 2A-2C are block diagrams of an aircraft vehicle thermal management system according to an embodiment, showing different heat sink loops.

One or more fluid control devices 46, 48 can be provided in the heat sink loop A to control circulation of the heat sink through the heat sink loop A. Thus, for example, the fluid control device 48 can route the heat sink, such as engine fuel, from the heat sink reservoir 24 to the vapor cycle refrigeration system 22 via the fluid flow passage 42, at which the vapor cycle refrigeration system 22 reduces the temperature of the heat sink. Further, the fluid control device 46 can route the heat sink from the vapor cycle refrigeration system 22 back to the heat sink reservoir 24 via the fluid flow passage 40. In one form, the fluid control device 46 and/or the fluid control device 48 can include for example one or more variable speed pumps and/or variable displacement pumps and/or control valves. The fluid control devices 46, 48 can be disposed for example in the respective fluid flow passages 40, 42, as shown. In another form, the fluid control devices 46, 48 can comprise a component, or components, of the vapor cycle refrigeration system 22 and/or the heat sink reservoir 24. Heat sink loop A is also shown in FIG. 2A as part of an embodiment to be discussed in greater detail below, with some fluid flow passages not shown to highlight the heat sink loop A.

The heat sink reservoir 24 can be for example a storage tank compatible with storing heat sink that varies in temperature suitable for cooling one or more electrical loads 14 in an application. In an embodiment in which the heat sink comprises engine fuel, the heat sink reservoir 24 can include for example a fuel storage tank that is separate from a main fuel storage tank of the aircraft. In one form, the fuel in the fuel storage tank forming the heat sink reservoir 24 is cooled so as to be relatively lower in temperature than that of the fuel stored in the main fuel storage tank. In the FIG. 1 embodiment, a single heat sink reservoir 24 is shown; the aircraft vehicle thermal management system 10 is not limited as such, and other embodiments are contemplated. For example, in one embodiment, multiple heat sink reservoirs 24 can be provided that contain heat sink at respectively different temperatures. Further, multiple heat sink reservoirs 24 can be provided for cooling respective multiple electrical loads 14 having for example different power demands. In another embodiment, for example in an application in which the vapor cycle refrigeration system 22 employs multi-stage vapor cycle refrigeration, multiple heat sink reservoirs 24 can be provided in fluid communication with the respective multiple stages. In one form, different temperature points are used for respective heat sink reservoirs 24 to effect a desired efficiency in refrigeration operation.

Figure 2B:
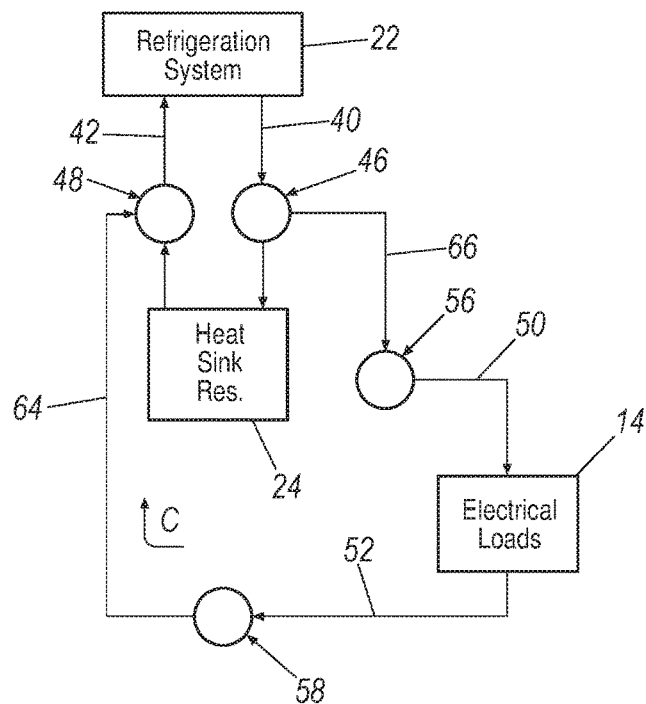
Figure 2C:
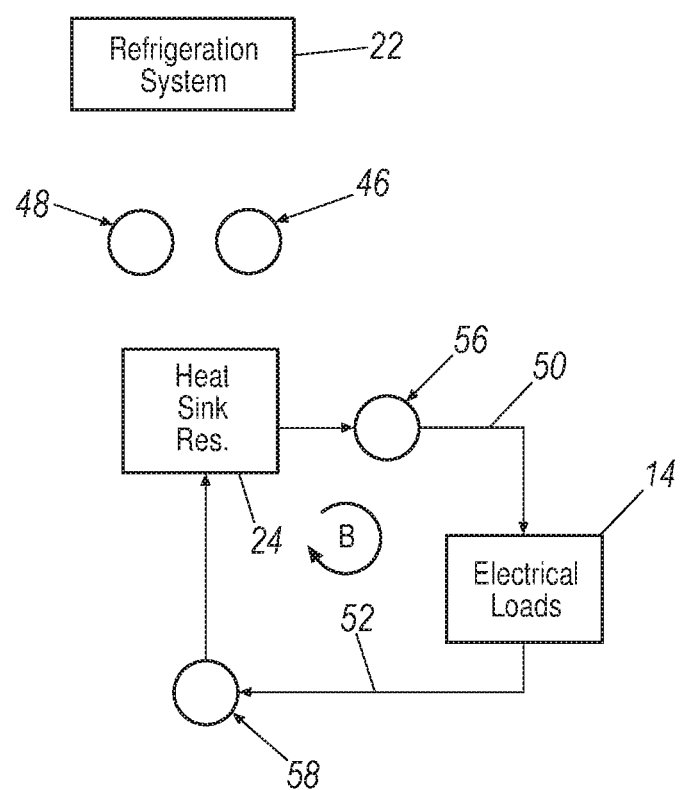

Heat sink in the heat sink reservoir 24 can cool the electrical load 14 via for example gravity feed to the electrical load 14 or in other manners such as in the FIG. 1 embodiment via a heat sink loop B formed by the heat sink reservoir 24, a first fluid flow passage 50, the electrical load 14 to be cooled, a second fluid flow passage 52, and a third fluid flow passage 54. One or more fluid control devices 56, 58 can be provided in the heat sink loop B to control circulation of the heat sink through the heat sink loop B. Thus, the fluid control device 56 can route cooled heat sink from the heat sink reservoir 24 to the electrical load 14 via the fluid flow passage 50, at which the cooled heat sink cools the electrical load 14. Further, the fluid control device 58 can route the heat sink from the electrical load 14 back to the heat sink reservoir 24 via the second fluid flow passage 52 and the third fluid flow passage 54. In one form, the fluid control device 56 and/or the fluid control device 58 can include for example one or more variable speed pumps and/or variable displacement pumps and/or control valves. The fluid control device 56 can be disposed for example in the fluid flow passage 50, as shown, and the fluid flow passage 58 can be disposed for example between the fluid flow passage 52 and the fluid flow passage 54, as shown. In another form, the fluid control devices 56, 58 can comprise a component, or components, of the heat sink reservoir 24 and/or the electrical load 14. Heat sink loop B is also shown in FIG. 2C as part of an embodiment to be discussed in greater detail below, with some fluid flow passages not shown to highlight the heat sink loop B.

The aircraft vehicle thermal management system 10 can include a heat sink loop C in which the heat sink, or a portion of the heat sink, can bypass all or part of the heat sink reservoir 24. Referring to FIG. 1, a fluid flow passage 64 can be used to transfer the heat sink from the electrical load 14 to the vapor cycle refrigeration system 22 rather than to the heat sink reservoir 24, and a fluid flow passage 66 and the fluid flow passage 50 can be used to transfer the heat sink from the vapor cycle refrigeration system 22 to the electrical load 14 rather than to the heat sink reservoir 24. Thus, the heat sink loop C can be formed by the first fluid flow passage 50, the electrical load 14 to be cooled, the second fluid flow passage 52, the third fluid flow passage 64, the fourth fluid flow passage 42, the vapor cycle refrigeration system 22, the fifth fluid flow passage 40, and the sixth fluid flow passage 66. The fluid control devices 46, 48, 56, 58 can control circulation of the heat sink through the heat sink loop C. Thus, for example, the fluid control devices 46, 56 can route heat sink from the vapor cycle refrigeration system 22 to the electrical load 14, bypassing the heat sink reservoir 24, via the fluid flow passages 40, 66, and 50, at which the heat sink cooled by the vapor cycle refrigeration system 22 cools the electrical load 14. Further, the fluid control devices 58, 48 can route heat sink from the electrical load 14 back to the vapor cycle refrigeration system 22, bypassing the heat sink reservoir 24, via the fluid flow passages 52, 64, and 42. Heat sink loop C is also shown in FIG. 2B as part of an embodiment to be discussed in greater detail below, with some fluid flow passages not shown to highlight the heat sink loop C.

In an embodiment, the heat sink loop A and the heat sink loop C are both used. As shown in FIG. 2A, the fluid control device 46 can route a portion of the heat sink cooled by the vapor cycle refrigeration system 22 to the heat sink reservoir 24 via the fluid flow passage 40, and the fluid control devices 46 and 56 can route a portion of the heat sink cooled by the vapor cycle refrigeration system 22 to the electrical load 14 via the fluid flow passages 66 and 50. Thus, flow from the refrigeration system 22 can be routed to the heat sink reservoir 24 or the electrical load 14, or to the heat sink reservoir 24 and the electrical load 14. Further, the fluid control device 48 can route heat sink from the heat sink reservoir 24 to the vapor cycle refrigeration system 24 to cool the heat sink in the heat sink reservoir 24, and fluid control devices 58 and 48 can route heat sink from the electrical load 14 to the vapor cycle refrigeration system 22 via the fluid flow passages 52, 64 and 42 to cool the heat sink from the electrical load 14. Thus, flow going to the vapor cycle refrigeration system 22 can be flow from the fluid flow passage 42 or the fluid flow passage 64, or the fluid flow passage 42 and the fluid flow passage 64. In an embodiment, the vapor cycle refrigeration system 22 serves to cool heat sink circulating through the heat sink loop A to cool the heat sink in the heat sink reservoir 24, as well as to cool the heat sink circulating through the heat sink loop C to cool the heat sink used for cooling the electrical load 14.

The aircraft vehicle power source 36 can provide power to the components of the thermal management system 10. The aircraft vehicle power source 36 can comprise an electrical, mechanical, or electro-mechanical, etc, power generation system, that provides power from, for example, an accessory gearbox (AGB), a generator driven by the gas turbine engine of the aircraft, an auxiliary power unit (APU) such as an electronic power supply for a particular application, for example, an avionics application, and/or power turbine driven by engine bleed. For example, in the FIG. 1 embodiment, the aircraft vehicle power source 36 can comprise a power generation unit that can provide power to the vapor cycle refrigeration system 22, the heat sink reservoir 24, and the electrical load 14, or multiple APUs that provide power respectively to the vapor cycle refrigeration system 22, the heat sink reservoir 24, and the electrical load 14. In one form, the aircraft vehicle power source 36 can provide power to the fluid control devices 46, 48, 56, 58, for example where the fluid control devices 46, 48, 56, 58 comprise electrically driven pumps. In one form, the aircraft vehicle power source 36 can provide power to the fluid control devices 46, 48, 56, 58 directly. In another form, the aircraft vehicle power source 36 can provide power to the fluid control devices 46, 48, 56, 58 indirectly, for example in applications in which the fluid control devices 46, 48, 56, 58 constitute part of another component powered by the aircraft vehicle power source 36, such as the vapor cycle refrigeration system 22 or the heat sink reservoir 24.

The controller 20 can be configured to control/distribute power among the components of the aircraft vehicle thermal management system 10, the electrical load 14, and/or the aircraft vehicle power source 36. Further, the controller 20 can be an all electrical device, an all mechanical device that can include any variety of devices such as gears, clutches, actuators, etc, or a combined electrical and mechanical system capable of distributing power among any of the various components. In an embodiment, the controller 20 can comprise multiple controllers. In one form, multiple controllers can be configured in different chasses or boxes, and/or in multiple locations, for example in the fore or aft of the aircraft.

In some embodiments where the controller 20 includes at least some electrical components, the controller 20 can communicate by use of shared memory or communication buses, and/or RF communications. The controller 20 can include a microprocessor or multiple microprocessors capable of executing and/or outputting command signals in response to received and/or stored data. In an embodiment, the controller 20 can include computer-readable storage, such as read-only memories (ROM), random-access memories (RAM), and/or flash memories, or any other components for running an application and processing data for controlling operations associated with the aircraft vehicle thermal management system 10 and/or the electrical load 14 and/or the power source 36. As such, the controller 20 can include instructions and/or data stored as hardware, software, and/or firmware within the one or more memories, storage devices and/or microprocessors. In one form, the controller 20 can include and/or be associated with power supply circuitry, solenoid driver circuitry, timing circuitry, switches and/or other types of circuitry, as suited for a thermal management application.

The controller 20 can include one or more data storage structures in the computer-readable medium containing data to facilitate operation of the aircraft vehicle thermal management system 10 in connection with an algorithm of the thermal management system 10. Alternatively and/or additionally, the controller 20 can include a feedback controller useful in regulating to a desired temperature which can be a constant, variable, etc. Such a feedback controller can take any variety of forms: continuous, bang-bang, etc. The data storage structures can include, for example, arrays, matrices, tables, variable classes, etc. In one form, data can be based on thermal and power control system performance, such as that of the electrical load 14, the refrigeration system 22, the heat sink reservoir 24, the fluid control devices 46, 48, 56, 58, and the aircraft vehicle power source 36 and/or other components or systems of the aircraft vehicle thermal management system 10 and/or the aircraft. In another form, data may be derived from performance test results, engineering knowledge, and/or other resources. For example, the data storage may include an appropriate amount of time for cooling the heat sink to effect a desired reduction in a peak transient load of the electrical load 14 and the refrigeration system 22. Additionally and/or alternatively, the data storage can include information which defines when it is most efficient to cool the heat sink.

Figure 3:
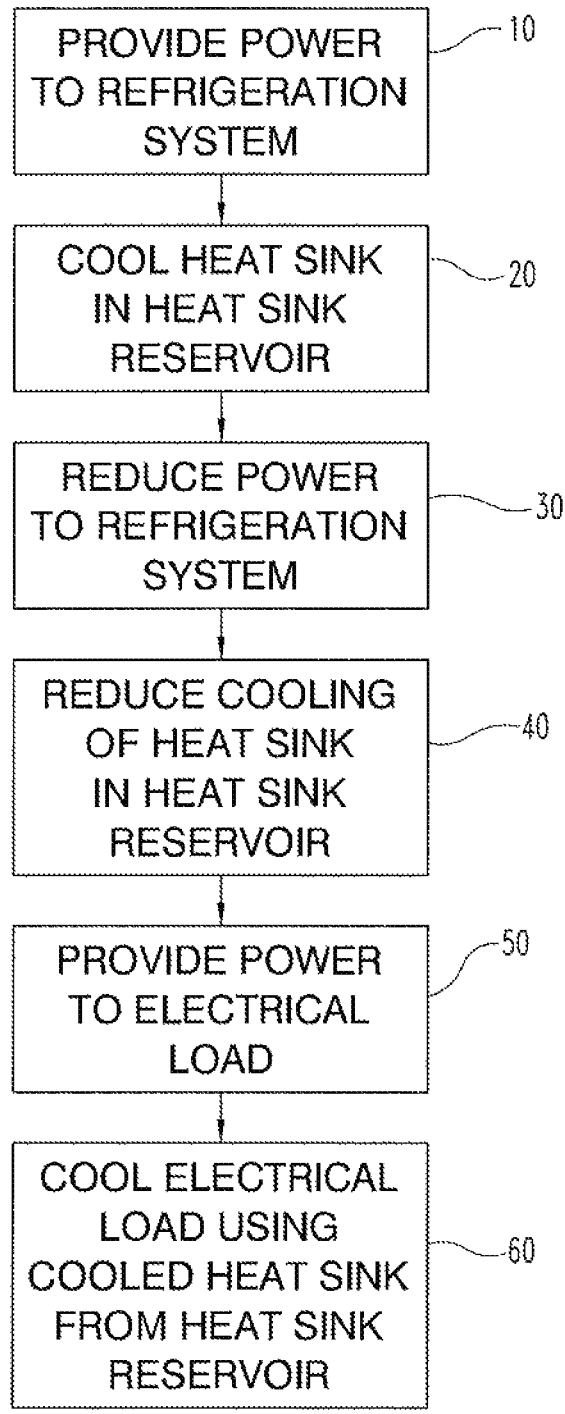
FIG. 3 is a flow chart of a method of thermally managing an electrical load according to an embodiment.

FIG. 3 is an example of a flow chart of a method of managing the thermal requirements of an electrical load 14 according to an embodiment. The controller 20 can be configured to control the aircraft vehicle power source 36 to provide an amount of power to the vapor cycle refrigeration system 22 (Step 10) and to control the vapor cycle refrigeration system 22 to reduce the temperature of, that is cool, the heat sink in the heat sink reservoir 24 (Step 20). In so doing, the fluid control devices 46, 48 can circulate the heat sink through the heat sink loop A, as shown in FIGS. 1 and 2A. In one form, the cooling can be performed while the aircraft vehicle is in flight. In another form, the cooling can be performed on the ground. The amount of power and the amount of time that is suitable to cool the heat sink can be based on data, type of controller, etc., as described above.

The controller 20 can be configured to control the aircraft vehicle power source 36 to reduce the amount of power, including in some applications discontinuing providing power, to the vapor cycle refrigeration system 22 (Step 30), and to control the vapor cycle refrigeration system 22 to reduce the amount of cooling, including in some applications discontinuing cooling, of the heat sink in the heat sink reservoir 24 (Step 40). In so doing, the fluid control device 48 can reduce the amount of circulation of heat sink, including in some applications discontinuing circulating the heat sink, from the heat sink reservoir 24 to the vapor cycle refrigeration system 22.

The controller 20 can be configured to distribute power derived from the aircraft vehicle power source 36 to provide an amount of power to the electrical load 14 or, if the aircraft vehicle power source 36 is already providing power to the electrical load 14, to increase the amount of power to the electrical load 14 (Step 50). Further, the controller 20 can be configured to control the heat sink reservoir 24 to provide cooled heat sink to the electrical load 14, at which the cooled heat sink cools the electrical load 14 (Step 60). In so doing, the fluid control device 56, 58 can circulate the cooled heat sink through the heat sink loop B, as shown in FIGS. 1 and 2C. The amount of power and the amount of time that is suitable to cool the electrical load 14 can be based on data, type of controller, etc, as described above.

As will be appreciated, the steps 10 through 60 of the FIG. 3 embodiment can be repeated as necessary or desired for an application. Further, in some applications the pre-cooled heat sink in the heat sink reservoir 24 can be used to cool multiple electrical loads 14. Further, in some applications pre-cooled heat sink in multiple heat sink reservoirs 24 can be used to cool a single electrical load 14.

As described above, the heat sink can be circulated through the heat sink loop B and/or the heat sink loop C to cool the electrical load 14. In an embodiment, for example in which the electrical load 14 has a high electrical power demand that causes the temperature of the heat sink to increase, the controller 20 can be configured to control the aircraft vehicle power source 36 to discontinue providing power to the vapor cycle refrigeration system 22, and to control the fluid control devices 56, 58 to transfer the heat sink from the heat sink reservoir 24 to the electrical load 14 and back to the heat sink reservoir 24, that is circulate the heat sink using the heat sink path B, as shown in FIG. 2C. In one form, the controller 20 can direct power to circulate the heat sink using the heat sink path B, for example, where the electrical load 14 has an electrical power demand that would be difficult for the aircraft vehicle power source 36 to meet while simultaneously providing power to the vapor cycle refrigeration system 22. In another form, the controller 20 can direct power to circulate the heat sink using the heat sink path B, for example, where the cooling of the electrical load 14 using the heat sink path C (FIG. 2B) would be in excess of the capability of the refrigeration system 22.

In another embodiment, for example in which the electrical load 14 has a mid or low electrical power demand that does not substantially increase the temperature of the heat sink, the controller 20 can be configured to control the aircraft vehicle power source 36 to continue providing power to the vapor cycle refrigeration system 22, and to control the vapor cycle refrigeration system 22, the heat sink reservoir 24, and/or the fluid control devices 48, 58 to return the heat sink to the vapor cycle refrigeration system 22 for cooling rather than to the heat sink reservoir 24, that is circulate the heat sink using the heat sink path C, as shown in FIG. 2A or FIG. 2B. In one form, the controller 20 can direct power to circulate the heat sink using the heat sink path C, for example, where the electrical load 14 has an electrical power demand that the aircraft vehicle power source 36 can meet while simultaneously providing power to the vapor cycle refrigeration system 22. In another form, the controller 20 can be configured to direct power to circulate the heat sink using the heat sink path C, for example, where the cooling of the electrical load 14 using the heat sink path C would be within the capability of the refrigeration system 22.

In another embodiment, the heat sink, or a portion thereof, from the electrical load 14 can be returned to the vapor cycle refrigeration system 22 (rather than to the heat sink reservoir 24), that is through heat sink path C, when the vapor cycle refrigeration system 22 can operate at a desired efficiency. In one form, the heat sink, or a portion thereof, from the heat sink reservoir 24 can be transferred to the vapor cycle refrigeration system 22, that is through heat sink path A, when the vapor cycle refrigeration system 22 can operate at a desired efficiency. In another form, the heat sink, or a portion thereof, from the electrical load 14, and the heat sink, or a portion thereof, from the heat sink reservoir 24, can be transferred to the vapor cycle refrigeration system 22, that is through heat sink paths C and A, respectively, when the vapor cycle refrigeration system 22 can operate at a desired efficiency.

As described above, the aircraft vehicle thermal management system 10 via the controller 20 can control the aircraft vehicle power source 36 to selectively increase or decrease the amount of power to the electrical load 14 and/or the vapor cycle refrigeration system 22. In one embodiment, the aircraft vehicle thermal management system 10 can average the amount of power for cooling so as to reduce the instantaneous or peak power demand for cooling for example a high electrical load 14.

For example, initially the aircraft vehicle power source 36 can provide power to the vapor cycle refrigeration system 22 to pre-cool an amount of heat sink. For example, the vapor cycle refrigeration system 22 can circulate the heat sink stored in the heat sink reservoir 24 through the heat sink loop A for a given amount of time (for example from 0 to 50 minutes to set forth just one non-limiting example) to reduce the temperature of the heat sink to for example a level sufficient for future cooling requirements. Thus, the pre-cooled heat sink is ready to be used for absorbing the heat to be generated by the high electrical load 14. In one form, as shown by the heat sink loops A and C in FIG. 2A, as the aircraft vehicle power source 36 provides power to the vapor cycle refrigeration system 22 to pre-cool the heat sink in the heat sink reservoir 24, the aircraft vehicle power source 36 can also provide power to electrical loads 14, for example low or mid electrical loads 14, and to the vapor cycle refrigeration system 22 to cool heat sink for cooling the low or mid electrical loads 14. In one form, the vapor cycle refrigeration system 22 uses excess cooling capacity to cool the heat sink while cooling the low or mid electrical loads 14. In one form, the fluid control device 48 mixes in portions of heat sink from the electrical load 14 and the heat sink reservoir 24 and routes the heat sink to the vapor cycle refrigeration system 22 for cooling. In one form, the fluid control device 46 routes cooled heat sink from the vapor cycle refrigeration system 22 in portions to the heat sink reservoir 24 and to the low or mid electrical loads 14.

In an embodiment, for example where the pre-cooled heat sink in the heat sink reservoir 24 is in a ready state (for example, fully cooled) for cooling the high electrical load 14, the aircraft vehicle power source 36 can discontinue providing cooling to the heat sink reservoir 24 and have the heat sink bypass the heat sink reservoir 24 as shown by the heat sink loop C in FIG. 2B, and continue providing power to the low or mid electrical loads 14 and the vapor cycle refrigeration system 22. That is, with the heat sink reservoir 24 fully cooled, the vapor cycle refrigeration system 22 can continue cooling low or mid electrical loads 14.

When power is to be provided to the high electrical load 14, the aircraft vehicle power source 36 can then reduce power, including in some applications discontinuing providing power, to the vapor cycle refrigeration system 22. The heat sink loop B shown in FIG. 2C provides an example in which power to the vapor cycle refrigeration system 22 is discontinued. With the power to the vapor cycle refrigeration system 22 reduced, the aircraft vehicle power source 36 can then provide power to the high electrical load 14 for an amount of time (for example from 50 to 60 minutes to set forth just one non-limiting example). To cool the high electrical load 14, the aircraft vehicle power source 36 need merely provide sufficient power to transfer the pre-cooled heat sink from the heat sink reservoir 24 to the high electrical load 14, rather than for example in the case of not using a pre-cooled heat sink, providing power to operate the vapor cycle refrigeration system 22 to cool the high instantaneous heat load of the electrical load 14 by reducing the heat sink temperature in addition to transferring the heat sink to the electrical load 14. In one form, the amount of power to transfer the pre-cooled heat sink from the heat sink reservoir 24 to the high electrical load 14 is substantially less than the amount of power to operate the vapor cycle refrigeration system 22 to pre-cool the heat sink for the high electrical load 14, that is to reduce the heat sink temperature, and transfer the pre-cooled heat sink to the electrical load 14, and therefore the peak power demand on the aircraft vehicle power source 36 can be reduced.

Figure 4:
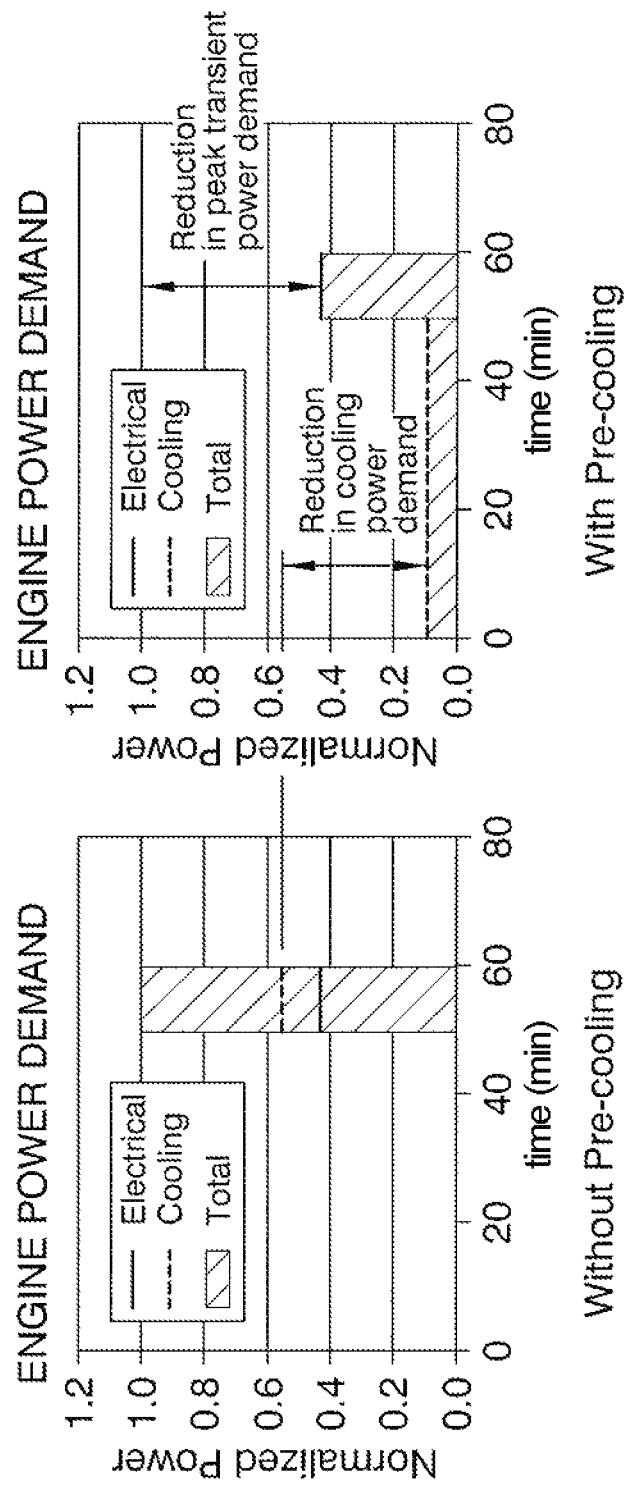
FIG. 4 is a comparison chart showing normalized power demand versus time according to an embodiment.

FIG. 4 is an example of comparison charts of how peak power demand on the aircraft vehicle power source 36 by an electrical load 14 and the vapor cycle refrigeration system 22 can be reduced, according to an embodiment. FIG. 4 shows a normalized power demand on the aircraft vehicle power source 36 for providing electrical power to the aircraft vehicle for an electrical load 14 that is turned on at 50 minutes and turned off at 60 minutes. Also shown in FIG. 4 is the electrical power provided to operate the vapor cycle refrigeration system 22 to cool the electrical load 14 with a refrigeration cycle. As will be appreciated, for purposes of clarity and to highlight the effect of the illustrated embodiment, in FIG. 4 the thermal mass effects of the heat sink are considered while the thermal mass effects of the electrical load 14 are not considered.

As shown in the left-side chart of FIG. 4, without pre-cooling, for example in the case where the aircraft vehicle power source 36 provides power to the electrical load 14 as well as to the vapor cycle refrigeration system 22 to cool the electrical load 14, the normalized power demand is 1.0. By pre-cooling the heat sink, for example from 0 to 50 minutes, the aircraft vehicle power source 36 effectively shifts the power for cooling the electrical load 14 to an earlier point in time. When the aircraft vehicle power source 36 provides power to the electrical load 14, for example from 50 to 60 minutes, the peak transient power demand on the aircraft vehicle power source 36 can be reduced by the amount of power that would have otherwise been necessary had no pre-cooled heat sink been used to cool the electrical load 14. That is to say, the peak transient power demand on the aircraft vehicle power source 36 can be lowered by the amount of power that would have otherwise been necessary to power the vapor cycle refrigeration system 22 to cool the electrical load 14. As shown in the right-side chart of FIG. 4, by using the pre-cooled heat sink to cool the electrical load 14 the normalized power demand is about 0.45 and, accordingly, the peak transient power demand on the aircraft vehicle power source 36 can be reduced by approximately 55% in the present embodiment.

In an embodiment, the controller 20 can control the aircraft vehicle power source 36 to provide power to the electrical load 14 and power to transfer the pre-cooled heat sink from the heat sink reservoir 24 to the high electrical load 14, when doing so would be less than the peak power demand that would otherwise occur without pre-cooling and shifting power.

Figure 5:
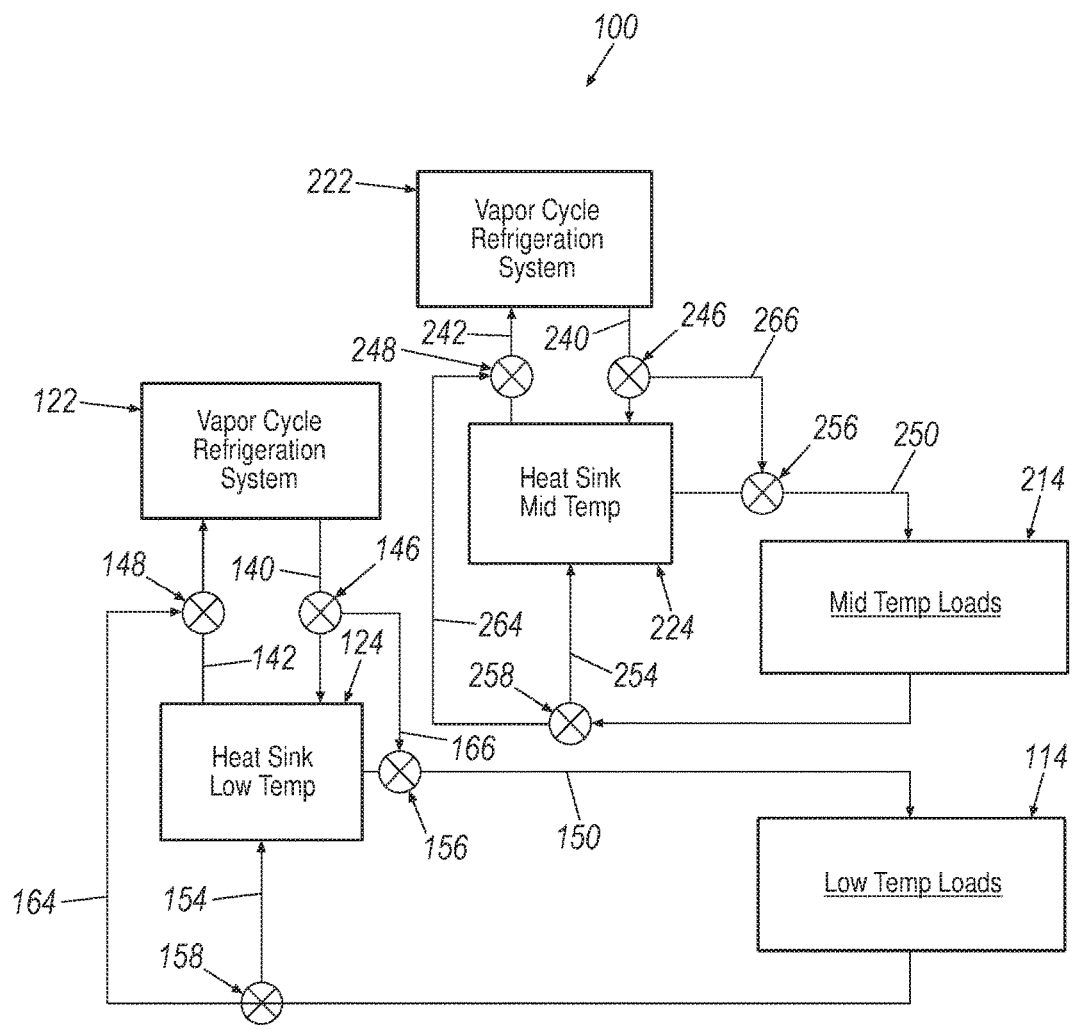
FIG. 5 is a block diagram of an aircraft vehicle thermal management system according to an embodiment.

Referring now to FIG. 5, there is shown a block diagram of an aircraft vehicle thermal management system 100 for use with for example a gas turbine engine, according to an embodiment. The thermal management system 100 can be used to manage the thermal requirements of low temperature electrical loads 114 and mid temperature electrical loads 214. An aircraft vehicle power source, or multiple power sources, can provide power to the components of the thermal management system 100 and the electrical loads 114, 214. A controller, or multiple controllers, can be configured to control the components of the thermal management system 100, the electrical loads 114, 214, and the aircraft vehicle power source(s). The method of operation of the aircraft vehicle power source(s) and the controller(s) can be as described above with respect to the aircraft vehicle power source 36 and the controller 20 of the embodiments of FIGS. 1-4, for example, and for purposes of clarity and brevity such description will not be repeated herein.

The thermal management system 100 includes a low temperature heat sink reservoir 124 that stores heat sink at a low temperature, and a mid-temperature heat sink reservoir 224 that stores heat sink at a mid-temperature. In the FIG. 5 embodiment, the first vapor cycle refrigeration system 122 can cool heat sink that is stored in the low temperature heat sink reservoir 124 via the fluid flow passages 140, 142, and the second vapor cycle refrigeration system 222 can cool heat sink that is stored in the mid temperature heat sink reservoir 224 via the fluid flow passages 240, 242. Further, the cooled heat sink in the heat sink reservoir 124 can be used for cooling the low temperature electrical loads 114 via the fluid flow passages 150, 154 and/or 164, and the cooled heat sink in the heat sink reservoir 224 can be used for cooling the mid temperature electrical loads 214 via the fluid flow passages 250, 254 and/or 264. The vapor cycle refrigeration systems 122, 222 can also be used for cooling the low and mid temperature electrical loads 114, 214 in a manner similar to that described above with respect to the embodiments of FIGS. 1-4.

In the illustrative embodiment, the first and second vapor cycle refrigerant systems 122, 222 are shown as separate systems. In another form, a single vapor cycle refrigeration system can be used. For example, a single vapor cycle refrigeration system can be used to cool heat sink first routed to the low temperature heat sink reservoir 124, and subsequently to the mid temperature heat sink reservoir 224. Also, in the illustrative embodiment, the low temperature heat sink reservoir 124 and the mid temperature heat sink reservoir 224 are shown as separate reservoirs, or tanks. As used herein, the low temperature electrical loads will be appreciated as those types of loads that benefit from low temperature heat sink. As one example, a low temperature heat sink would be beneficial for loads that generate very high amounts of heat and if not cooled properly cease to perform as desired. As another example, a low temperature heat sink would be beneficial for an electrical load 14 that must be kept at a very low temperature.

In the FIG. 5 embodiment, like components and like features of the first and second vapor cycle refrigeration systems 122, 222, and the vapor cycle refrigeration system 22, are indicated by similar reference numerals except that first system components have 100 added to the reference numerals, and second system components have 200 added to the reference numerals. The method of operation of the first and second vapor cycle refrigeration systems 122, 222, the heat sink reservoirs 124, 224, the fluid control devices 146, 148, 156, 158, 246, 248, 256, 258, and the low and mid temperature electrical loads 114, 214, can be as they are respectively described above with respect to the embodiments of FIGS. 1-4, for example, and for purposes of clarity and brevity such description will not be repeated herein.

In an embodiment, a gas turbine engine can be reduced in size and weight by reducing the peak power requirements, according to an embodiment. In a further embodiment, the chill-store-absorb approach can be used to reduce the size of heat exchangers and condensers based on the peak amount of heat to be rejected is reduced. In one form, the chillstore-absorb approach can be used to reduce the size of heat exchangers and condensers so that the engine air stream pressure drops associated with relatively larger heat exchangers can be avoided or reduced. In another form, the cost and weight associated with the heat exchangers and condensers can be reduced. In another embodiment, a refrigeration system can be reduced in size and weight based on implementation of the chill-store-absorb approach. In one form, the overall efficiency of the refrigeration system can be improved, as the engine fuel can be pre-cooled during mission points where the refrigeration system can operate more efficiently. When the refrigeration system becomes insufficient due to having to reject to a high temperature sink, the pre-cooled fuel can be used to cool the system.

According to an aspect, an air vehicle power and thermal management system includes an aircraft controller structured to distribute power provided by a gas turbine engine between a cooling system to cool an engine fuel cooling medium and an electrically powered load to drive the electrically powered load; the aircraft controller being configured to: direct the power to create a first duration cooling power from the gas turbine engine to the cooling system to cool the engine fuel cooling medium, wherein the first duration cooling power is directed over a first power time period, and shift the power to reduce the first duration cooling power to create a load electrical power to the electrically powered load to drive the electrically powered load over a second power time period that follows the first power time period, and wherein by operation of the aircraft controller to shift the power from the first duration cooling power to the load electrical power a second duration cooling power is provided to the cooling system to cool the electrically powered load using the engine fuel cooling medium that was cooled during the first power time period by the first duration cooling power.

In one form, the aircraft controller is configured to direct the power to create the load electrical power at a higher wattage than the first duration cooling power.

In one form, the aircraft controller includes multiple controllers.

In one form, the aircraft controller is configured to direct the power to create the first duration cooling power from the gas turbine engine to a refrigeration device of the cooling system to cool the engine fuel cooling medium.

In one form, by operation of the aircraft controller the second duration cooling power is provided as zero watts to the refrigeration device of the cooling system.

In one form, by operation of the aircraft controller the second duration cooling power is provided to a cooling transfer mechanism of the cooling system to cool the electrically powered load using the cooled engine fuel cooling medium.

In one form, by operation of the aircraft controller the second duration cooling power is provided to a fluid control device of the cooling system to transfer the cooled engine fuel cooling medium to the electrically powered load.

In one form, the aircraft controller is configured to direct power to create the first duration cooling power from the gas turbine engine to a refrigeration device of the cooling system to cool the engine fuel cooling medium, wherein by operation of the aircraft controller the second duration cooling power is provided to a fluid control device of the cooling system to transfer the cooled engine fuel cooling medium to the electrically powered load.

In one form, the aircraft controller is configured to direct the power to create the first duration cooling power at a higher wattage than the second duration cooling power.

According to an aspect, an aircraft thermal regulation system for thermally cooling an electrically driven aircraft component, includes a thermal management device, an electrically driven aircraft component, an aircraft power source, and an air vehicle control unit; the thermal management device being configured to operate at a first power to reduce a temperature of a cooling system fluid in a cooling system reservoir and at a second power to use the cooling system fluid from the cooling system reservoir to cool the electrically driven aircraft component; the electrically driven aircraft component being configured to operate at a third power; the aircraft power source being configured to provide the first power and the second power to the thermal management device and to provide the third power to the electrically driven aircraft component; and the air vehicle control unit being configured to control a flow of power from the aircraft power source to provide the first power over a first period of time, and to control the flow of power from the aircraft power source to discontinue the first power and provide the second power and the third power over a second period of time.

In one form, the thermal management device includes a refrigeration unit to reduce the temperature of the cooling system fluid in the cooling system reservoir.

In one form, the thermal management device includes a thermal transfer unit to cool the electrically driven aircraft component.

In one form, the thermal management device includes a fluid control unit to transfer the cooling system fluid from the cooling system reservoir to the electrically driven aircraft component.

In one form, the thermal management device includes a refrigeration unit to reduce the temperature of the cooling system fluid, and a fluid control unit to transfer the cooling system fluid from the refrigeration unit to the electrically driven aircraft component and back to the refrigeration unit; the thermal management device being configured to operate at a fourth power to drive the refrigeration unit and the fluid control unit; the aircraft power source being configured to provide the fourth power to the thermal management device; and the air vehicle control unit being configured to control the aircraft power source to provide the fourth power over at least a portion of the first period of time.

In one form, the second power is zero watts over at least a portion of the second period of time.

In one form, the third power at which the electrically driven aircraft component is configured to operate is relatively greater than the first power and relatively greater than the second power at which the thermal management device operates.

According to an aspect, a method of thermally managing an electrical system of an air vehicle includes providing power to a cooling system of the air vehicle to cool a thermal storage medium stored in a reservoir; reducing the power to the cooling system for an amount of time; and directing power to the electrical system and using the cooled thermal storage medium stored in the reservoir to cool the electrical system for at least a portion of the amount of time.

In one form, the thermal storage medium includes a portion of the engine fuel of the air vehicle.

In one form, the providing power to the cooling system includes power to a cyclic refrigeration system of the cooling system to cool the thermal storage medium stored in the reservoir.

In one form, the providing power to the cooling system includes providing power to a fluid transfer unit, and the using the cooled storage medium includes using the fluid transfer unit to transfer the cooled storage medium to the electrical system to cool the electrical system.

In one form, the providing power to the cooling system includes providing power to a cyclic refrigeration system of the cooling system to cool the thermal storage medium stored in the reservoir, and providing power to a fluid transfer unit, and the using the cooled storage medium includes using the fluid transfer unit to transfer the cooled storage medium to the electrical system to cool the electrical system, and the reducing the power to the cooling system for the amount of time includes reducing the power to zero watts.

In one form, the providing power to a cooling system includes providing power to a plurality of cooling systems of the air vehicle to cool respective plural thermal storage media stored in respective reservoirs.

In one form, the directing power to the electrical system includes directing power to a plurality of electrical systems and using the cooled thermal storage medium includes using the respective plural thermal storage media stored in the respective reservoirs to cool respective plural electrical systems for at least the portion of the amount of time.

In one form, the method includes, after directing power to the electrical system and using the cooled thermal storage medium stored in the reservoir to cool the electrical system for at least a portion of the amount of time, repeating the providing, reducing, and directing.

According to an aspect, a thermal and power managing system for an aircraft electrical load includes means for providing power to a cooling system of the air vehicle to cool a thermal storage medium stored in a reservoir; means for reducing the power to the cooling system for an amount of time; and means for directing power to the electrical system and using the cooled thermal storage medium stored in the reservoir to cool the electrical system for at least a portion of the amount of time.

Any theory, mechanism of operation, proof, or finding stated herein is meant to further enhance understanding of embodiment of the present disclosure and is not intended to make the present disclosure in any way dependent upon such theory, mechanism of operation, proof, or finding. In reading the claims, it is intended that when words such as "a," "an," "at least one," or "at least one portion" are used there is no intention to limit the claim to only one item unless specifically stated to the contrary in the claim. Further, when the language "at least a portion" and/or "a portion" is used the item can include a portion and/or the entire item unless specifically stated to the contrary.

While embodiments of the disclosure have been illustrated and described in detail in the drawings and foregoing description, the same is to be considered as illustrative and not restrictive in character, it being understood that only the selected embodiments have been shown and described and that all changes, modifications and equivalents that come within the spirit of the disclosure as defined herein of by any of the following claims are desired to be protected. It should also be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow.

What is claimed is:

1. An air vehicle power and thermal management system comprising:
   a first refrigeration system;
   a first heat sink reservoir;
   a first electrical load;
   first fluid control devices coupled between the first refrigeration system and the first heat sink reservoir;
   second fluid control devices coupled between the first heat sink reservoir and the first electrical load; and
   an aircraft controller configured to:
      direct a first heat sink fluid from the first refrigeration system to the first heat sink reservoir, via control of the first fluid control devices, to cool the first heat sink reservoir; and
      direct the first heat sink fluid from the first heat sink reservoir to the first electrical load, via the second fluid control devices, to cool the first electrical load using the first heat sink reservoir.

2. The air vehicle power and thermal management system of claim 1, wherein the aircraft controller is further configured to disconnect the first refrigeration system from the first heat sink reservoir, using the first fluid control devices, once the first heat sink reservoir is cooled.

3. The air vehicle power and thermal management system of claim 1, wherein the aircraft controller is further configured to reduce power to the first refrigeration system once the first heat sink fluid is directed from the first heat sink reservoir to the first electrical load.

4. The air vehicle power and thermal management system of claim 1, wherein the first heat sink fluid is gas turbine engine fuel.

5. The air vehicle power and thermal management system of claim 1, wherein the first heat sink reservoir includes a fluid that is gas turbine engine fuel.

6. The air vehicle power and thermal management system of claim 1, wherein the aircraft controller is configured to direct excess cooling capacity from the first refrigeration system to the first heat sink reservoir while the first heat sink fluid is also directed from the first heat sink reservoir to the first electrical load.

7. The air vehicle power and thermal management system of claim 1, further comprising:
   a second refrigeration system;
   a second heat sink reservoir;
   a second electrical load;
   third fluid control devices coupled between the second refrigeration system and the second heat sink reservoir;
   fourth fluid control devices coupled between the second heat sink reservoir and the second electrical load; and
   the aircraft controller configured to:
      direct a second heat sink fluid from the second refrigeration system to the second heat sink reservoir, via control of the third fluid control devices, to cool the second heat sink reservoir; and
      direct the second heat sink fluid from the second heat sink reservoir to the second electrical load, via the fourth fluid control devices, to cool the second electrical load using the second heat sink reservoir; and
   wherein the second heat sink reservoir is at a temperature that is lower than a temperature of the first heat sink reservoir.

8. An aircraft thermal regulation system for thermally cooling an electrically driven aircraft component, comprising:
   a first thermal management device, a first electrically driven aircraft component, an aircraft power source, and an air vehicle control unit, the first thermal management device further comprising:

a first refrigeration system powered by the aircraft power source;

a first heat sink reservoir;

first fluid control devices coupled between the first refrigeration system and the first heat sink reservoir;

second fluid control devices coupled between the first heat sink reservoir and the first electrically driven aircraft component; and the air vehicle control unit configured to:
   direct a first heat sink fluid from the first thermal management device to the first heat sink reservoir, via control of the first fluid control devices, to cool the first heat sink reservoir; and
   direct the first heat sink fluid from the first heat sink reservoir to the first electrically driven aircraft component, via the second fluid control devices, to cool the first electrically driven aircraft component using the first heat sink reservoir.

9. The aircraft thermal regulation system of claim 8, wherein the air vehicle control unit is further configured to disconnect the first refrigeration system from the first heat sink reservoir, using the first fluid control devices, once the first heat sink reservoir is cooled.

10. The aircraft thermal regulation system of claim 8, wherein the air vehicle control unit is further configured to reduce power to the first refrigeration system once the first heat sink fluid is directed from the first heat sink reservoir to the first electrically driven aircraft component.

11. The aircraft thermal regulation system of claim 8, wherein the first heat sink fluid is gas turbine engine fuel.

12. The aircraft thermal regulation system of claim 8, wherein the first heat sink reservoir includes a fluid that is gas turbine engine fuel.

13. The aircraft thermal regulation system of claim 8, wherein the air vehicle control unit is configured to direct excess cooling capacity from the first refrigeration system to the first heat sink reservoir while the first heat sink fluid is also directed from the first heat sink reservoir to the first electrically driven aircraft component.

14. The aircraft thermal regulation system of claim 8, further comprising a second thermal management device further comprising:
   a second refrigeration system powered by the aircraft power source;
   a second heat sink reservoir;
   a second electrically driven aircraft component;
   third fluid control devices coupled between the second refrigeration system and the second heat sink reservoir;
   fourth fluid control devices coupled between the second heat sink reservoir and the second electrical load; and
   the air vehicle control unit further configured to:
      direct a second heat sink fluid from the second refrigeration system to the second heat sink reservoir, via control of the third fluid control devices, to cool the second heat sink reservoir; and
      direct the second heat sink fluid from the second heat sink reservoir to the second electrical load, via the fourth fluid control devices, to cool the second electrical load using the second heat sink reservoir;
   wherein the second heat sink reservoir is at a temperature that is lower than a temperature of the first heat sink reservoir.

15. A method of thermally managing an electrical system of an air vehicle comprising:
   directing a first heat sink fluid from a first refrigeration system to a first heat sink reservoir, via control of first fluid control devices, to cool the first heat sink reservoir; and
   directing the first heat sink fluid from the first heat sink reservoir to a first electrical load, via second fluid control devices, to cool the first electrical load using the first heat sink reservoir.

16. The method of claim 15, further comprising disconnecting the first refrigeration system from the first heat sink reservoir, via the first control devices, once the first heat sink reservoir is cooled.

17. The method of claim 15, further comprising reducing power to the first refrigeration system once the first heat sink fluid is directed from the first heat sink reservoir to the first electrical load.

18. The method of claim 15, wherein the first heat sink fluid is gas turbine engine fuel.

19. The method of claim 15, wherein the first heat sink reservoir includes a fluid that is gas turbine engine fuel.

20. The method of claim 15, further comprising directing excess cooling capacity from the first refrigeration system to the first heat sink reservoir while the first heat sink fluid is also directed from the first heat sink reservoir to the first electrical load.

* * * * *